United States Patent [19]

Johnson

[11] Patent Number: 5,025,603
[45] Date of Patent: Jun. 25, 1991

[54] MODULAR SPACE DIVIDING PANELS HAVING WIRE MANAGEMENT CHANNELS

[75] Inventor: Gary C. Johnson, Grand Haven, Mich.

[73] Assignee: Herman Miller, Inc., Zeeland, Mich.

[21] Appl. No.: 504,588

[22] Filed: Apr. 4, 1990

[51] Int. Cl.⁵ .............................................. E04H 1/00
[52] U.S. Cl. ........................................ 52/221; 52/239; 174/40
[58] Field of Search ................ 52/221, 239, 241, 220, 52/36, 238.1; 160/351, 135, 127; 174/48, 49

[56] References Cited

U.S. PATENT DOCUMENTS

| | | |
|---|---|---|
| Re. 31,733 | 11/1984 | Haworth et al. . |
| 678,903 | 7/1901 | Rapp . |
| 1,708,351 | 4/1929 | Auld . |
| 2,260,178 | 10/1941 | Guignon, Jr. . |
| 2,682,938 | 7/1954 | MacDonald . |
| 3,691,709 | 9/1972 | Ostborg . |
| 3,831,330 | 8/1974 | Tacke et al. . |
| 4,104,838 | 8/1978 | Hage et al. ............................ 52/239 |
| 4,199,206 | 4/1980 | Haworth et al. . |
| 4,433,630 | 2/1984 | Laborie . |
| 4,596,098 | 6/1986 | Finkbeiner et al. ................... 52/220 |
| 4,631,881 | 12/1986 | Charman . |
| 4,771,583 | 9/1988 | Ball et al. ............................. 52/221 |
| 4,774,119 | 9/1988 | Imhoff . |
| 4,795,355 | 1/1989 | Dorn et al. . |
| 4,891,922 | 1/1990 | Hozer et al. .......................... 52/239 |

Primary Examiner—Richard E. Chilcot, Jr.
Attorney, Agent, or Firm—Varnum, Riddering, Schmidt & Howlett

[57] ABSTRACT

A modular space dividing panel comprising a pair of panlike frames. Each frame has a side wall with inwardly directed flanges at the edges thereof which form a bottom wall, a pair of end edge walls, and a top wall. The frames are positioned and assembled together in facing relationship such that at least portions of the bottom walls, the end edge walls, and the top walls overlap in contacting relationship. The top walls include portions that define therebetween a substantially continuous channel that extends along an upper edge of the panel. The channel is of a size to receive communication and/or electrical wiring therein. A top cap extends along the upper edge of the panel and overlying the channel and is releasably secured to the top walls of the frames.

34 Claims, 3 Drawing Sheets

MODULAR SPACE DIVIDING PANELS HAVING WIRE MANAGEMENT CHANNELS

BACKGROUND OF THE INVENTION

1. Field of the Invention

This invention relates to modular space dividing panels having wire management means and, more particularly, to modular panels having formed in upper edges thereof upwardly facing channels adapted to receive wiring.

2. Description of the Related Art.

Office arrangements of the open plan type utilize modular space dividing panels to divide otherwise large open areas into smaller, more functional work spaces. In a typical arrangement, rigid space dividing panels are joined at their side edges by panel connectors and are arranged in a linear or angular array to subdivide the large open area. Panel returns can extend normally from the space dividing panels and, in part, define the individual work stations. The space dividing panels frequently are provided with vertical hanging intelligence in the form of a plurality of vertically elongated slots formed in the side edges of the panels or in the panel connectors. Work surfaces, storage compartments, and the like are hung from the vertical hanging intelligence and are cantilevered from the space dividing panels to furnish the work station.

A myriad of electrical and communications equipment, such as computer terminals and associated peripheral equipment, lighting, typewriters, telephones, as well as more personal items such as clocks and radios are often associated with the individual work stations. To facilitate the use of such equipment, it is necessary to provide readily accessible electrical and communications utilities to the work stations. Numerous attempts have been made to design structures that facilitate the provision of the electrical and communications utilities. In some structures presently known, a cable raceway is mounted to a lower edge of the space dividing panel and extends horizontally along the panel lower edge between the panel lower edge and the floor, the raceway often being enclosed by a baseboard or the like. Examples of such arrangements are shown in U.S. Pat. No. 4,795,355, issued Jan. 3, 1989 to Dorn, et al., U.S. Pat. No. 4,376,561, issued Mar. 15, 1983, to Vanden Hoek, et al., and U.S. Pat. No. 4,308,418, issued Dec. 29, 1981 to Van Quik, et al.

In another presently known structure, a separate raceway is mounted along an upper edge of the panel and is connected to the principal utility supply by way of a vertically extending chase. An example of such a design is shown in U.S. Pat. No. 4,716,698, issued Jan. 5, 1988 to Wilson, et al. In a related structure disclosed in U.S. Pat. No. 4,375,010 issued Feb. 22, 1983 to Mollenkopf, modular wall panels include a channel-shaped upper horizontal frame member to which an electric raceway channel member is separately secured. The panels are mounted to tubular center posts which require special transition caps in order to bridge the electric wiring from one panel to an adjacent panel. In still another arrangement, the cabling is routed internally of the panels, as shown in U.S. Pat. No. 4,214,799, issued July 29, 1980 to Biche.

However, in those structures presently known, it is difficult to access the wiring for purposes of maintenance and repair and to reconfigure the work stations because the cables are routed beneath the panels or interiorly thereof. It is often the case in a dynamic work environment that communications and data wiring is upgraded or expanded as additional computer stations, communications devices and the like are provided. However, in those arrangements presently known, it may be difficult and cumbersome to incorporate the additional wiring into the existing system. There may also be a need to segregate the power wiring from the communications and data wiring in order to comply with certain regulatory or industry codes or standards.

Reconfiguration of existing open plan type office arrangements would be greatly facilitated by the provision of modular space dividing panels that include a wiring channel easily accessible from the exterior of the panel so that the panel would not have to be disassembled or significantly disturbed in order to augment the existing wiring or to maintain and repair the same. For such a system to be functional within office arrangements presently used, wiring management channels formed in the space dividing panels must to be adapted to be aligned, one panel relative to an adjacent panel, so that the wiring can be extended without interruption along the entire angular or linear array of space dividing panels. Similarly, the panel connectors used to secure one panel to an adjacent panel must be adapted to facilitate bridging the wiring from the one panel to the adjacent panel.

SUMMARY OF THE INVENTION

The invention is for a modular space dividing panel comprising a pair of panlike frames having a side wall with inwardly directed flanges at the edges thereof. The inwardly directed flanges form a bottom wall, a pair of end edge walls, and a top wall for each frame. To assemble the frames, they are positioned in a facing relationship such that at least portions of the bottom walls, the end edge walls, and the top walls overlap in contacting relationship. Each top wall includes means that define therebetween a substantially continuous channel that extends along an upper edge of the panel, the channel being of a size to receive communication and/or electrical wiring therein. Each panlike frame is of generally substantially identical construction and is formed from a sheet of metal of relatively thin gauge.

A modular space dividing panel according to the invention further includes means for securing the panlike frames together in facing relationship such as a screw, rivet, bolt or the like. Furthermore, a top cap extends along the upper edge of the panel and overlies the channel and includes means for releasably securing the top cap to the top walls of the frames. More particularly the top cap can include a pair of resilient legs that engage the top walls of the panlike frames, the resilient nature of the legs releasably securing the top cap to the top walls of the frames.

The channel defining means can include an L-shaped flange in the top wall of each frame, each L-flange including a pair of legs that are substantially perpendicular to each other. When in the assembled configuration, one of the pair of legs of one frame overlaps in contacting relationship one of the pair of legs of the other frame. More particularly, each overlapping leg can include a notch that defines first and second leg portions that are adjacent to each other. Thus, in the assembled configuration, the first leg portion of one frame overlies and contacts the first leg portion of the other frame, and the second leg portion of the second frame overlies and contacts the second leg portion of the first frame.

The bottom wall of each frame may have a similar construction wherein a notch separates a first bottom wall portion from an adjacent second bottom wall portion. Thus, in the assembled configuration, the first bottom wall portion of one frame overlies and contacts the first bottom wall portion of the second frame, and the second bottom wall portion of the second frame overlies and contacts the second bottom wall portion of the first frame.

A modular space dividing panel according to the invention can further comprise means for mounting the panel to a support. The panel mounting means can include a top wedge block having a portion defining a channel formed therein, which channel is of a size to receive communication and/or electrical wiring therein. More specifically, the top wedge block can include a base and a pair of legs extending from the base in parallel, spaced apart fashion, the legs defining the wedge block channel therebetween. In assembly, the top wedge block can be secured to a side edge of the panel such that the wedge block channel is aligned with the channel formed in the panel. The panel mounting means can also include a top draw block that is engageable with the top wedge block, a bottom wedge block that is engageable with a bottom draw block, and means for drawing the wedge blocks and the draw blocks together to securely mount the panel to the support. The support can be provided by the side edge of an adjacent panel.

BRIEF DESCRIPTION OF THE DRAWINGS

The invention will now be described with reference to the drawings in which.

DETAILED DESCRIPTION OF THE PREFERRED EMBODIMENTS

Figure 1:
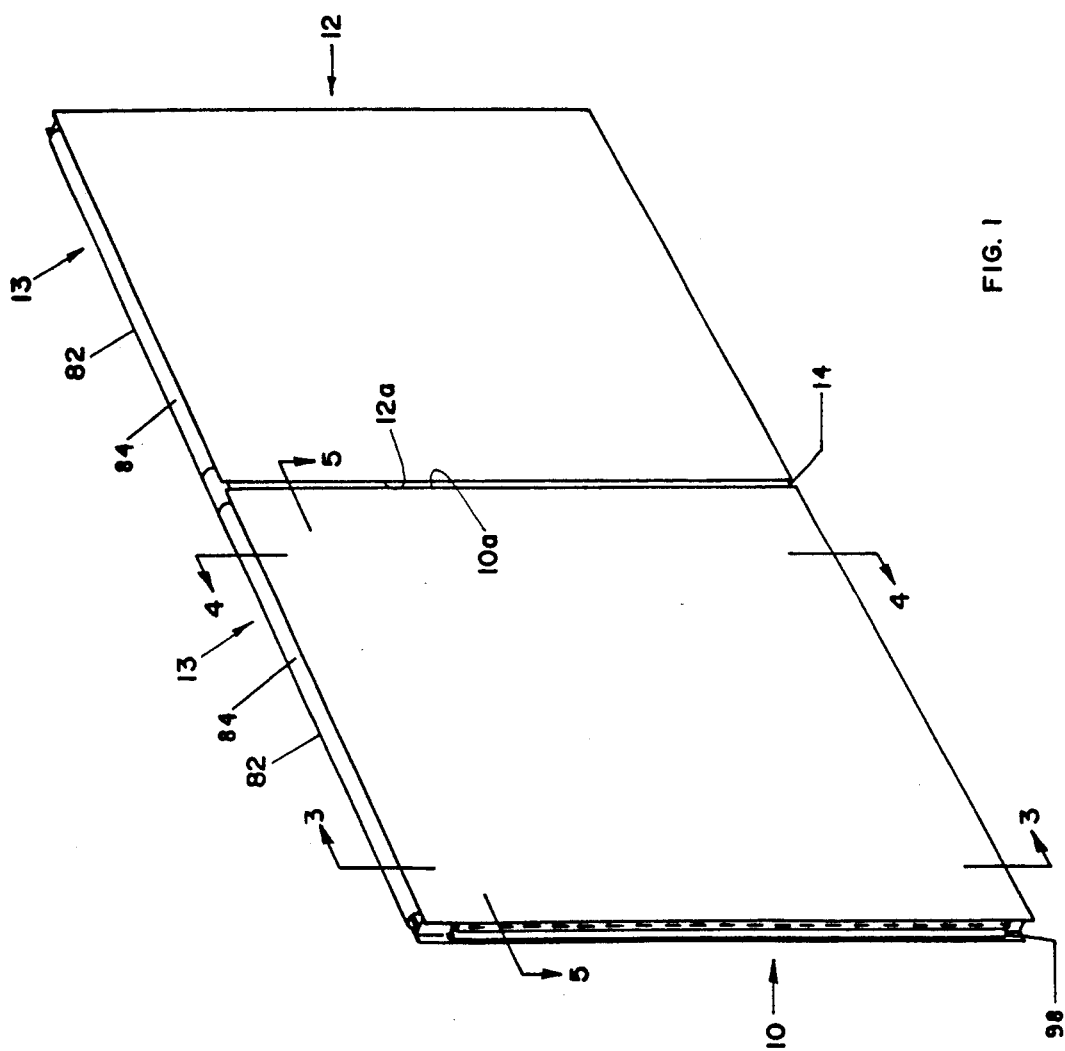
FIG. 1 is a perspective view of a pair of modular space dividing panels incorporating wire management means according to the invention.

Turning now to the drawings, FIG. 1 illustrates a pair of substantially rectangular, rigid, modular space dividing panels 10 and 12 having wire management means 13 according to the invention incorporated therein. The panels 10 and 12 are connected at adjacent side edges 10a and 12a, respectively, by panel connector means 14, as explained more fully hereinbelow. The space dividing panels 10 and 12 can be supported and stabilized by panel returns (not shown separately in the drawings) that are secured to the connector means 14 and which extend outwardly from the panels in a direction substantially normal thereto. The panel returns can have a height less than that of the panels 10 and 12 or may be as high as the panels. In a third arrangement (also not shown separately in the drawings), the panels 10 and 12 may be supported and stabilized by a floor bracket or the like, an example of which is disclosed in U.S. Pat. No. 3,674,230 issued July 4, 1972 to R. L. Propst.

Although only a pair of panels 10 and 12 is shown in FIG. 1, it will be understood by those having ordinary skill in the art that in a typical office environment of the open plan type, a plurality of panels substantially identical to the panels 10 and 12 would be joined at their side edges and arranged in a linear or angular array thereby subdividing an otherwise large open area into smaller, more functional work spaces. Vertical hanging intelligence is often associated with the panel side edges 10a, 12a or with the panel connector means 14. The vertical hanging intelligence typically comprises a plurality of vertically elongated slots, an example of which is disclosed in the aforementioned U.S. Pat. No. 3,674,230 to Propst. Work surfaces, storage compartments and the like (not shown separately in the drawings) are engaged with the vertical hanging intelligence and cantilevered from the panels 10 and 12.

The structure of the modular panels 10 and 12 is substantially identical and will be described particularly only with reference to the panel 10. The structure of the panel 10 is best shown in FIGS. 2 to 5 and comprises a pair of substantially identical pans or panlike frames 16 and 18 of relatively thin gauge (for example, 0.02 inches) sheet metal having inwardly directed edge portions or flanges that are disposed in a substantially overlapping relationship, thus creating a void 20 therebetween. The void 20 may be filled with a sound absorbing and insulating material 22 such as a cardboard or paperboard honeycomb core, expanded synthetic resin foam, fiberglass batts or the like. (The material 22 is not shown in FIG. 2 to simplify the illustration. Similarly, the material 22 is only partially shown in FIGS. 3 to 5.) The assembled panlike frames can be covered with a decorative fascia layer 23 such as fabric or vinyl which is secured to the frames by any appropriate manner such as adhesive. Preferably, the color and texture of the fascia layers are selected to blend aesthetically with the surrounding environment.

Figure 3:
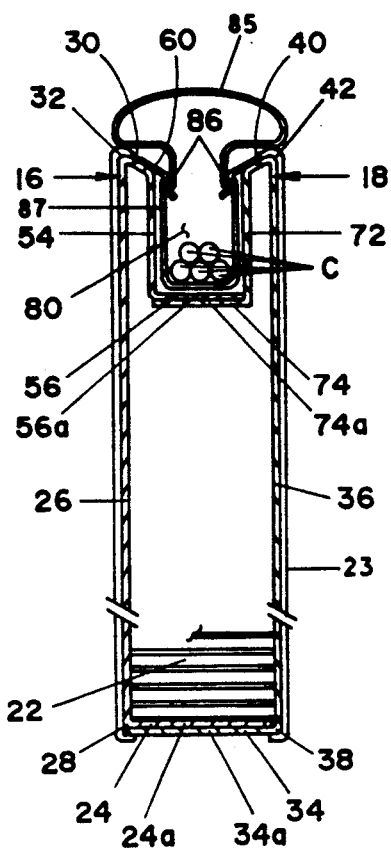
FIG. 3 is a sectional view taken along lines 3—3 of FIG. 1.
Figure 4:
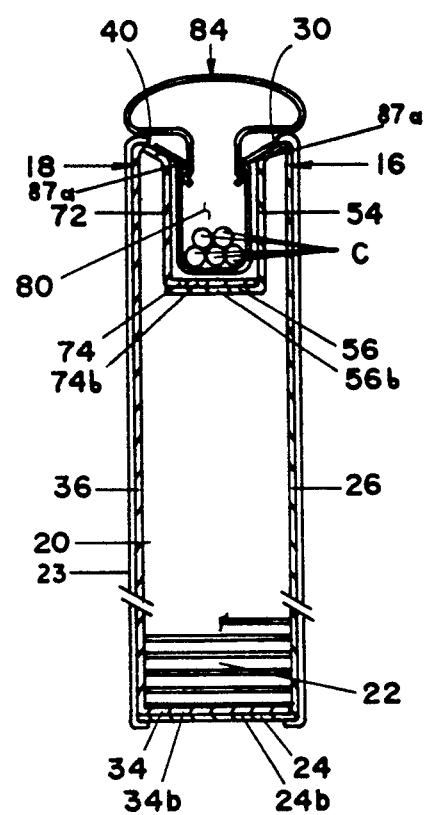
FIG. 4 is a sectional view taken along lines 4—4 of FIG. 1.

The pan 16 comprises a bottom wall 24, a sidewall 26 extending normally from an outer edge 28 of the bottom wall, and a top wall 30 extending substantially normally from an upper edge 32 of the sidewall and substantially parallel, in part, to the bottom wall. As shown in FIGS. 3 and 4, the top wall 30 may be angled slightly downwardly which is well within the scope of the invention. The bottom wall 24 includes adjacent bottom wall portions 24a, 24b separated by a notch 25. Similarly, the pan 18 comprises a bottom wall 34, a sidewall 36 extending normally from an outer edge 38 of the bottom wall, and a top wall 40 extending substantially normally from an upper edge 42 of the sidewall and substantially parallel to, in part, the bottom wall. (The top wall 40 can also be angled slightly downwardly without affecting the significance of the invention.) The bottom wall 34 includes a pair of bottom wall portions 34a, 34b separated by a notch 35.

The pan 16 further includes a pair of opposed end edge walls 44, 46 that extend outwardly from, respectively, opposed side edges 48, 50 of the side wall 26. More particularly, the end edge wall 44 extends from the side edge 48 of the side wall 26 while the end edge wall 46 extends from the side edge 50. Although, in FIG. 2, the end edge walls 44, 46 include slight return flanges such that the end walls are closely adjacent to, respectively, the edges 48, 50 of the sidewall 26, such a construction should be regarded as one in which the end edge walls extend from the side wall side edges.

The pan 16 also comprises an L-shaped flange 52, which includes a first leg 54 and a second leg 56 that extends at substantially a right angle relative to the first leg. The second leg 56 of the L-shaped flange 52 includes first and second leg portions 56a, 56b separated by a notch 58, the significance of which is explained more fully hereinbelow. The L-shaped flange 52 is integral with the top wall 30 of the pan and a forms a part thereof. The flange is secured to an inner edge 60 of the top wall structure such that the first leg 54 is substantially parallel to the pan side wall 26 and further such that the second leg 56 is substantially parallel to the bottom wall 24.

Similarly, the pan 18 further includes a pair of opposed end edge walls 62, 64 that extend outwardly from, respectively, opposed side edges 66, 68 of the side wall 36. Thus, the end edge wall 62 extends from the side edge 66 of the side wall 36 while the end edge wall 64 extends from the side edge 68. The pan 18 also comprises an L-shaped flange 70 which includes first and second legs 72, 74 which are substantially perpendicular to each other. The second leg 74 includes first and second leg members 74a, 74b separated by a notch 76. The L-shaped flange 70 is integral with the top wall 40 of the pan 18 and forms a part thereof. The flange 70 is secured to an inner edge 78 of the top wall 40. The first leg 72 is substantially parallel to the pan side wall 36; the second leg 74 is substantially parallel to the pan bottom wall 34.

In assembly, the pans 16, 18 are disposed in a facing and substantially overlapping relationship such that the bottom wall 24 of the pan 16 contacts and overlies the bottom wall 34 of the pan 18. More specifically, as best shown in FIGS. 3 and 4, the bottom wall portion 24a contacts and overlies the bottom wall portion 34a. However, in FIG. 4, the relative orientation of the bottom wall portions is reversed. That is, the bottom wall portion 34b contacts and overlies the bottom wall portion 24b. The relationship between the bottom wall portions reverses or crosses over at the engagement of the notches 25, 35. Reversal of the overlapping portions of the bottom walls creates tension which provides means for securing the pans 16, 18 together. The relative orientation of the bottom wall portions can be reversed from that shown in the drawings.

Figure 5:
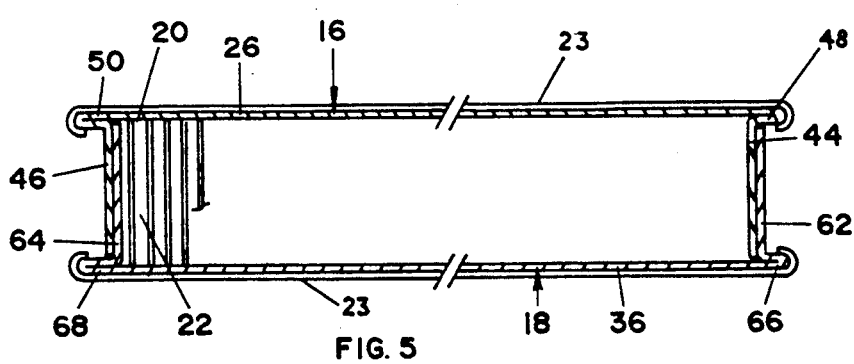
FIG. 5 is a sectional view taken along lines 5—5 of FIG. 1.

As best shown in FIG. 5, the end edge wall 44 of the pan 16 can be disposed to the interior of and in a contacting relationship with the end edge wall 62 of the pan 18. In such an arrangement, because the pans 16, 18 are substantially identical, the end edge wall 46 of the pan 16 is disposed exteriorly of the end edge wall 64 of the pan 18. Of course it will be understood that the relative positions of the pans 16, 18 may be reversed such that the end edge wall 62 is interior to the end edge wall 44 while the end edge wall 64 is exteriorly of the end edge wall 46.

The overlapping relationship between the L-shaped flanges 52, 70 is best shown in FIGS. 3 and 4 and is similar to the engagement of the bottom walls described above. In FIG. 3, the first leg portion 56a of the second leg 56 of the L-flange 52 contacts and overlies the first leg portion 74a of the second leg 74 of the L-flange 70. In FIG. 4, however, the relative orientation of the flanges has been reversed. That is, the second leg portion 74b of the L-flange 70 contacts and overlies the second leg portion 56b of the L-flange 52. Thus, in comparing FIGS. 3 and 4, the flange positions have been reversed, the notches 58 and 78 providing the crossing over point at which the position of the flanges reverse. Of course, the respective orientations illustrated in FIGS. 3 and 4 can be reversed one with respect to the other. The overlapped orientation imparts tension to the panel which provides means for securing the pans 16, 18 together.

The pans 16 and 18 ca be further secured together by appropriate mechanical fasteners such as screws, bolts, rivets or the like, or can be welded. The fasteners can be received through the overlapped portions of the pans 16, 18 such as the end edge walls, the bottom walls, or the second legs of the L-flanges. If threaded fasteners are utilized a threaded fastener receiver such as a nut can be welded to an inside surface of the inner most pan wall, for example. Alternatively, self-tapping metal screws can be used.

Thus, when the pans 16 and 18 are assembled as described hereinabove, the flange legs 54, 56, 72, and 74 of the L-shaped flanges 52, 70 cooperate to define an upwardly opening wire management channel 80 therebetween. The channel 80 is an integral portion of the panel 10 and extends substantially continuously along an upper edge 82 thereof. The panel 10 may further include a top cap 84 that extends along the upper edge 82 of the panel and overlies the wire management channel thereby protecting the channel and electrical and/or communication cables C carried therein from damage, intrusion of dirt, and the like. Preferably, the top cap 84 includes a head 85 and resiliently tensioned legs 86 depending from opposed edges of the head and which are received within the channel 80. The legs 86 can bear against the first legs 54, 72 of the L-flanges 52, 70, respectively. Alternatively, the channel 80 can be provided with a liner 87 having protousions 87a or the like which are adapted to engage the legs 86. In any event, the resilient nature of the legs 86 provide means for releasably securing the top cap 84 to the upper edge 82 of the panel 10 in overlying relationship to the channel 80. As shown in FIGS. 3 and 4, the wire management channel 80 is adapted to receive and retain the cables C. The cables C can be power wiring and/or communication and data wiring, although in order to satisfy certain construction standards that require segregation of power wiring from communication and data wiring, it is preferred that the channel 80 be used solely for communication and data wiring.

Figure 6:
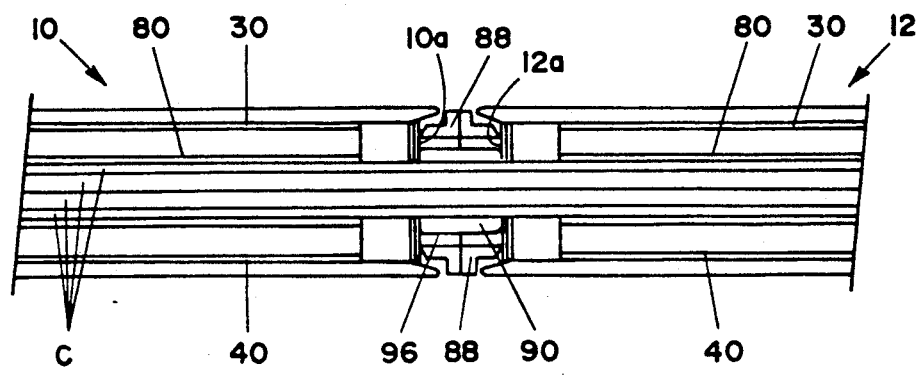
FIG. 6 is a partial top plan view of FIG. 1.

FIG. 6 is a partial plan view of the panel arrangement of FIG. 1, but with the top caps 84 thereof removed. Reference numerals pertaining to the panel 12 identify elements identical or analogous to elements of the panel 10 bearing the same reference numeral. The channels 80 associated with the panels 10 and 12 are substantially aligned with each other and provide substantially continuous and uninterrupted means for arranging and distributing the cables C. Because the channels 80 are integrally formed in upper edges of the panels and because the top caps 84 are releasably securd thereto, the cables C are easily accessible from the exterior of the panels 10 and 12. Although a top cap 84 can be included to further protect the cables C, the top caps are easily removed from the panels 10 and 12, thereby facilitating access to the cables. There is no need to disassemble the panels 10 or 12 or to remove baseboard covers to gain access to the area beneath the panel lower edge as is required when reconfiguring the panels presently known.

Figure 2:
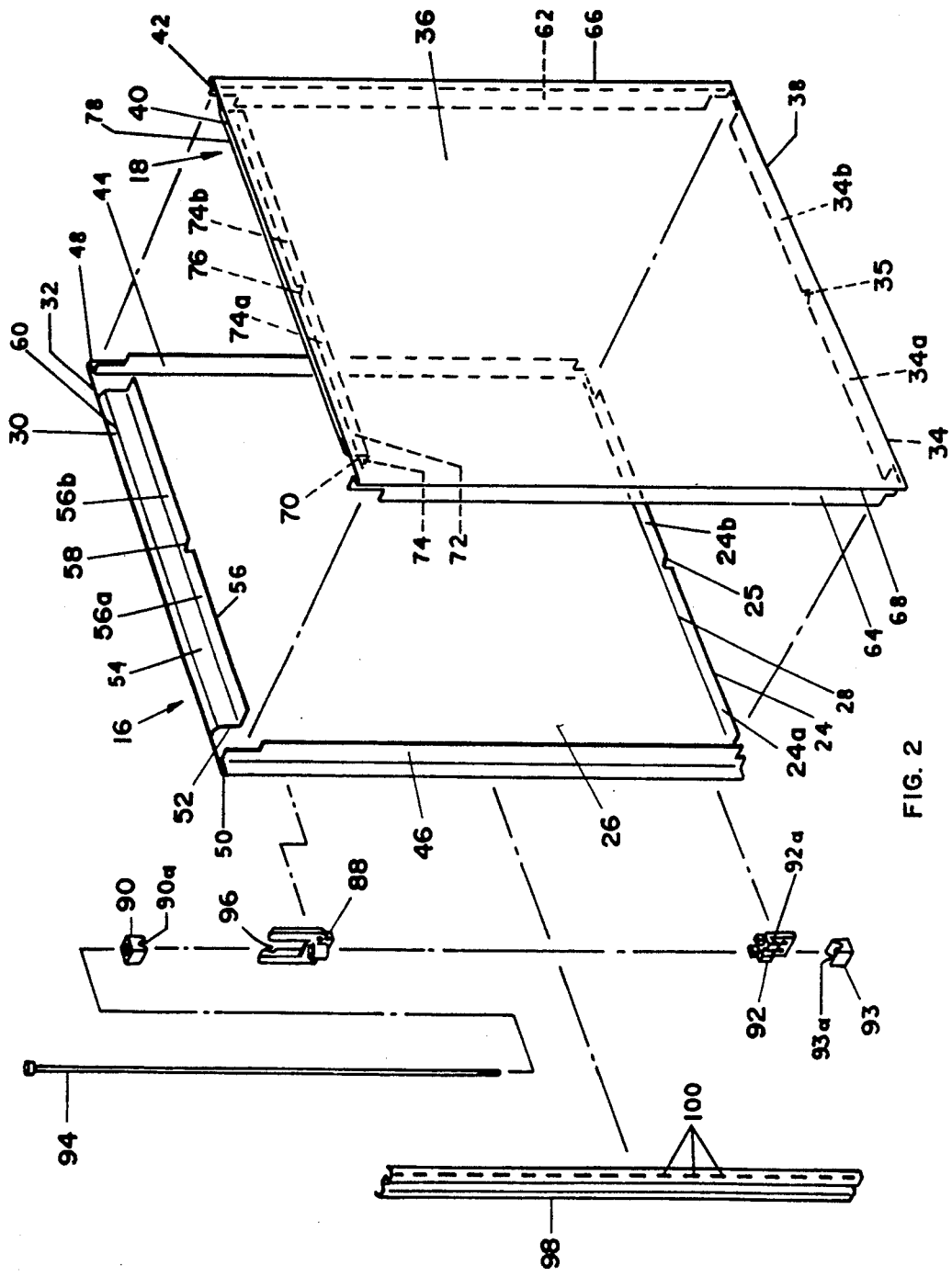
FIG. 2 is an exploded perspective view of a space dividing panel according to the invention.

The panel connector means 14 are shown in part in FIGS. 2 and 6. (The panel connector means 14 have been eliminated from FIG. 5 to simplify the illustration.) In general, the panel connector means 14 utilize a system of wedge blocks, draw blocks, and draw rods. Connector systems of this type are known generally and an example is disclosed in U.S. Pat. No. 3,430,997 which issued Mar. 4, 1969 to Herman Miller, Inc. However, a connector system of the particular type shown in the patent to Herman Miller, Inc. is not adapted for use in conjunction with modular panels according to the invention because they incorporate wire management channels. The panel connector means 14 comprise a top wedge block 88, a top draw block 90, a bottom wedge block 92, a bottom draw block 93, and a draw rod 94. The top wedge block 88 includes a base and a pair of legs that extend from the base in parallel, spaced apart fashion and define a channel 96 therebetween. The top draw block 90 is a substantially cubical member having an inverted V-shaped groove 90a formed therein. The bottom wedge block 92 includes a downwardly projecting lip 92a. The bottom draw block 93 is substantially similar to the top draw block 90 and includes a V-shaped groove 93a.

In assembly, top wedge blocks 88 are secured to opposed and facing edges 10a, 12a of the two adjacent modular panels 10, 12, the channels 96 formed in the blocks 88 being aligned with the panel wire management channels 80. The top draw block 90 is received within the channels 96, the inverted V-shaped groove thereof engaging complementarily shaped surfaces on the top wedge blocks 88. Bottom wedge blocks 92 are similarly secured to the panel edges 10a, 12a adjacent to the lower edges of the panels. The lips 92a thereof are directed downwardly and are engaged with the V-shaped groove 93a of the bottom wedge blocks 93. The draw rod 94 is received within aligned openings formed in the top wedge block 88, the top draw block 90, the bottom wedge block 92, and a threaded opening in the bottom draw block 93 and is rotated to draw the top draw block and the bottom draw block toward with each other with the top and bottom wedge blocks therebetween. Because the wedge block channel 96 is aligned with the wire management channel 80, the extension of the cables C from the panel 10 to the adjacent panel 12 is facilitated for lay in wiring capabilities.

Alternatively, although not shown specifically in the drawings, a panel according to the invention can be secured to a square tubular connector post in a manner similar to that described above as opposed to being connected to another panel. Such an arrangement is particularly useful when it is desired to arrange adjacent panels in other than a 180° linear orientation. Thus, the panels according to the invention include means for mounting the panel to a support which support can be a connector post or a second panel of nearly identical construction.

As best shown in FIGS. 1 and 2, the panels 10, 12 can further include hanger frames 98 mounted to the panel edges 10a, 12a. (The hanger frames 98 have been eliminated from FIG. 5 for purposes of clarity.) The hanger frames 98 can include a series of vertically elongated slots 100 formed therein which slots provide the vertical hanging intelligence described hereinabove. Various components (not shown separately in the drawings) such as work surfaces, storage modules and the like are supported by the vertical hanging intelligence through bracket mounts and are suspended from the panels in cantilevered fashion. The hanger frames 98 can be secured to the panel side edges by the same mechanical fasteners which are used to secure the pans 16, 18 together.

Thus, there has been provided a modular space dividing panel having integrally formed in an upper edge thereof an upwardly opening wire management channel that is easily accessible from the exterior of the panel and which can be substantially aligned with similar channels formed in adjacent panels thereby providing continuous and uninterrupted means for arranging and distributing cabling.

Reasonable variations or modifications are possible within the spirit of the foregoing specification and drawings without departing from the scope of the invention which is defined in the accompanying claims.

The embodiments for which an exclusive property or privilege is claimed are defined as follows:

1. A modular space dividing panel comprising:
   a pair of panlike frames having a side wall with inwardly directed flanges at the edges thereof forming a bottom wall, a pair of end edge walls, and a top wall, the frames being positioned in facing relationship wherein at least portions of the bottom walls, the end edge walls, and the top walls overlap in contacting relationship, and means in the respective top walls to define therebetween a substantially continuous channel extending along an upper edge of the panel, the channel being of a size to receive communication and/or electrical wiring therein;
   means for securing the panlike frames together in facing relationship;
   a top cap extending along the upper edge of the panel and overlying the channel; and
   means for releasably securing the top cap to the top walls of the frames in overlying relationship to the channel.

2. A modular space dividing panel according to claim 1 wherein the channel defining means includes an L-shaped flange in the top wall of each frame.

3. A modular space dividing panel according to claim 2 wherein each L-shaped flange includes a pair of legs that are substantially perpendicular to each other.

4. A modular space dividing panel according to claim 3 wherein one of the pair of legs of one frame overlaps in contacting relationship one of the pair of legs of the other frame when the frames are in the assembled configuration.

5. A modular space dividing panel according to claim 3 wherein each overlapping leg includes a notch that defines first and second leg portions.

6. A modular space dividing panel according to claim 5 wherein the first leg portion of said on frame overlies and contacts the first leg portion of said other frame, and the second leg portion of said other frame overlies and contacts the second leg portion of said one frame.

7. A modular space dividing panel according to claim 6 wherein the securing means comprise at least one fastener for fastening the panlike frames together.

8. A modular space dividing panel according to claim 7 wherein the bottom wall of each frame includes a notch separating a first bottom wall portion from a second bottom wall portion thereof.

9. A modular space dividing panel according to claim 8 wherein the first bottom wall portion of one frame overlies and contacts the first bottom wall portion of the other frame, and the second bottom wall portion of said other frame overlies and contacts the second bottom wall portion of said one frame.

10. A modular space dividing panel according to claim 4 wherein the bottom wall of each frame includes a notch separating a first bottom wall portion from a second bottom wall portion thereof.

11. A modular space dividing panel according to claim 10 wherein the first bottom wall portion of one frame overlies and contacts the first bottom wall portion of the other frame, and the second bottom wall portion of said other frame overlies and contacts the second bottom wall portion of said one frame.

12. A modular space dividing panel according to claim 1 wherein the pair of frames are substantially identical in shape.

13. A modular space dividing panel according to claim 12 wherein each frame is formed from a sheet of metal of relatively thin gauge.

14. A modular space dividing panel according to claim 1 wherein the releasable top cap securing means includes a pair of resilient legs.

15. A modular space dividing panel according to claim 14 wherein the legs releasably engage the top walls of the panlike frames.

16. A modular space dividing panel according to claim 14 wherein the channel defining means include an L-shaped flange in the top wall of each frame and the legs releasably engage the L-shaped flanges.

17. A modular space dividing panel according to claim 1 further comprising means for mounting the panel to a support, the panel mounting means including a top wedge block having a portion defining a channel formed therein, the channel being of a size to receive communication and/or electrical wiring therein.

18. A panel according to claim 17 wherein the top wedge block includes a base and a pair of legs extending from the base in spaced apart fashion, the legs defining the wedge block channel therebetween.

19. A panel according to claim 18 wherein the top wedge block is secured to a side edge of the panel, the wedge block channel being aligned with the panel channel.

20. A panel according to claim 19 the panel mounting means further including a top draw block engagable with the top wedge block and means for drawing the wedge block and the draw block together to securely mount the panel to the support.

21. A panel according to claim 20 wherein the drawing means includes a threaded rod that is engagable with the draw block and the wedge block to draw them together.

22. A panel according to claim 19 the panel mounting means further including a bottom wedge block, a bottom draw block, and means for drawing the bottom wedge block and the bottom draw block together to securely mount the panel to the support.

23. A panel according to claim 22 wherein the bottom wedge block is mounted to a side edge of the panel.

24. A modular space dividing panel comprising:
a pair of panlike frames having a side wall with inwardly directed flanges at the edges thereof forming a bottom wall, a pair of end edge walls, and a top wall, the frames being positioned in facing relationship wherein at least portions of the bottom walls, the end edge walls, and the top walls overlap in contacting relationship, and means in the respective top walls to define therebetween a substantially continuous channel extending along an upper edge of the panel, the channel being of a size to receive communication and/or electrical wiring therein;
means for securing the panlike frames together in facing relationship; and
means for mounting the panel to a support, the mounting means including a top wedge block having a portion defining a channel formed therein, the channel being of a size to receive communication and/or electrical wiring therein.

25. A panel according to claim 24 wherein the top wedge block includes a base and a pair of legs extending from the base in spaced apart fashion, the legs defining the wedge block channel therebetween.

26. A panel according to claim 25 wherein the top wedge block is secured to a side edge of the panel, the wedge block channel being aligned with the panel channel.

27. A panel according to claim 26 the panel mounting means further including a top draw block engagable with the top wedge block and means for drawing the wedge block and the draw block together to securely mount the panel to the support.

28. A panel according to claim 27 wherein the drawing means includes a threaded rod that is engagable with the draw block and the wedge block to draw them together.

29. A panel according to claim 26 the panel mounting means further including a bottom wedge block, a bottom draw block, and means for drawing the bottom wedge block and the bottom draw block together to securely mount the panel to the support.

30. A panel according to claim 29 wherein the bottom wedge block is mounted to a side edge of the panel.

31. A panel according to claim 24 wherein the support is a second panel of substantially identical construction.

32. A panel according to claim 31 wherein the first and second panels are mounted together at the side edges thereof.

33. A panel according to claim 32 wherein a top wedge block is mounted to the side edge of each panel, each wedge block channel being aligned with its respective panel channel and further wherein the wedge block channels are aligned with each other so as to define a substantially continuous wire management channel extending along the upper edges of the panels.

34. A panel according to claim 33 further comprising a top cap extending along the upper edges of the panels and overlying the channels, and means for releasably securing the top cap to the top walls of the panels in overlying relationship to the channels.

* * * * *